United States Patent [19]

Altieri, Jr.

[11] Patent Number: 5,102,080
[45] Date of Patent: Apr. 7, 1992

[54] PIZZA WEDGE SUPPORT

[76] Inventor: Joseph Altieri, Jr., 119 Avondale Rd., Norristown, Pa. 19403

[21] Appl. No.: 682,301

[22] Filed: Apr. 9, 1991

[51] Int. Cl.⁵ .......................................... A45D 11/04
[52] U.S. Cl. ...................................... 248/174; 224/275
[58] Field of Search .................. 248/174, 459, 152; 206/563, 45.19, 45.25; 229/104, 16 D; 108/111, 44; 224/275, 42.45 R; 211/73

[56] References Cited

U.S. PATENT DOCUMENTS

| 844,066 | 2/1907 | Warren | 248/459 |
| 1,207,577 | 12/1916 | Loose | 248/459 |
| 1,675,060 | 6/1928 | Simmons | 248/459 |
| 2,875,940 | 3/1959 | Dunn | 224/275 X |
| 2,887,216 | 5/1959 | Hargraves | 224/42.45 R X |
| 3,326,446 | 6/1967 | Goings | 108/44 X |
| 3,420,382 | 1/1969 | McClendon | 248/311.2 X |
| 3,499,595 | 3/1970 | Brooks | 248/174 X |
| 4,765,583 | 8/1988 | Tenner | 224/275 X |
| 4,832,241 | 5/1989 | Radcliffe | 224/275 |
| 4,905,947 | 3/1990 | Henne | 248/152 |
| 4,949,890 | 8/1990 | Schultz | 224/275 |

Primary Examiner—J. Franklin Foss
Attorney, Agent, or Firm—Leon Gilden

[57] ABSTRACT

A wedge member is arranged to provide a horizontal surface when disposed upon an inclined upper surface of an automotive seat. The wedge member is arranged to define an acute included angle from ten to thirty degrees. The organization, in an optional embodiment, includes a strap for receiving an automotive seat belt, as well as an aligned series of cylindrical cup recesses for receiving cup members.

1 Claim, 3 Drawing Sheets

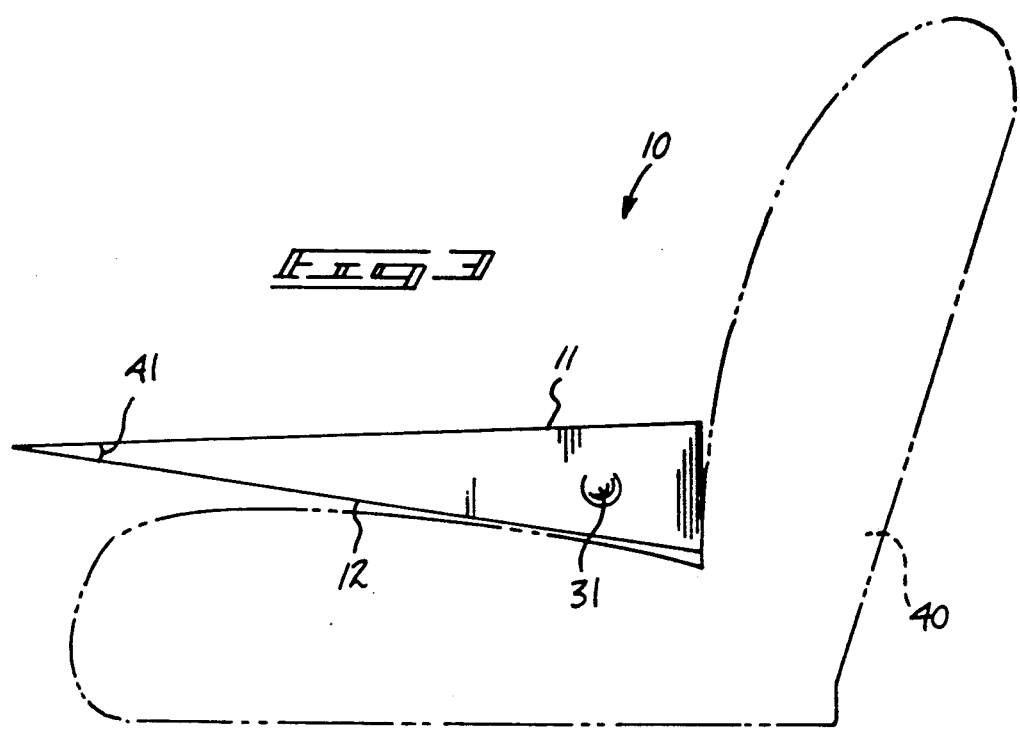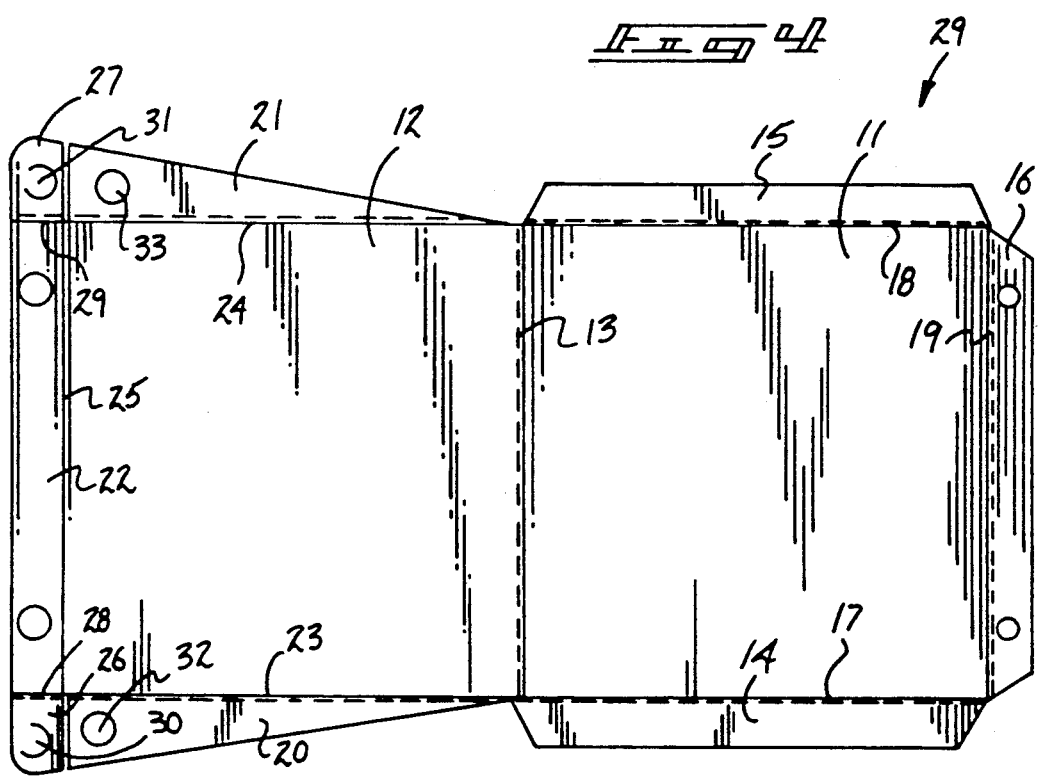

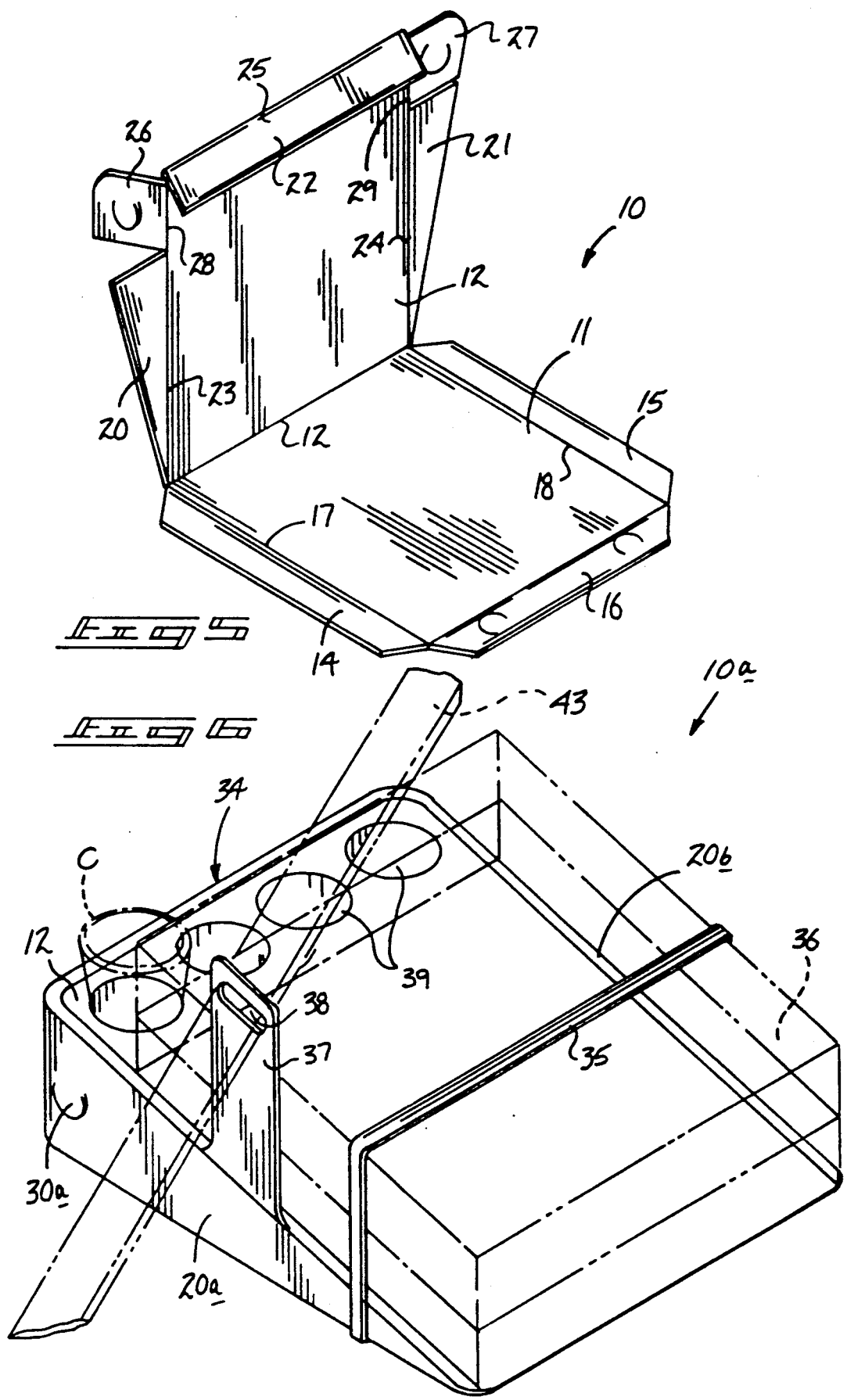

PIZZA WEDGE SUPPORT

BACKGROUND OF THE INVENTION

1. Field of the Invention

The field of invention relates to pizza container devices, and more particularly pertains to a new and improved pizza wedge support wherein the same maintains horizontal alignment of pizza food members when transported upon automotive seats to maintain positioning of various food components on an associated pizza.

2. Description of the Prior Art

In transporting of pizza food components as commercially available from various outlets, they are typically positioned upon seat members of automobiles during their transport. In such an angular orientation as is typically present in a top surface of an automotive seat, various food components and sauce on a pizza is subject to displacement. The instant invention attempts to overcome deficiencies of the prior art by maintaining a horizontal support surface for an associated pizza food component when positioned upon an automotive seat. Examples of prior art container structure may be exemplified in U.S. Pat. No. 4,863,003 to Carter setting forth a combination seat cushion and tote bag providing a flexible support arrangement for use as a seat member.

U.S. Pat. No. 4,231,127 to Bendell sets forth a folding cushion and support, wherein the cushion members provide container cavities therewithin.

U.S. Pat. No. 4,604,987 to Keltner sets forth a heated stadium cushion for use on stadium-type seating.

U.S. Pat. No. 4,116,310 to Shields sets forth a shoulder strap bag and cushion arrangement. U.S. Pat. No. 4,783,120 to Kiechlin sets forth a seat cushion utilizing various pouch members therewithin.

As such, it may be appreciated that there continues to be a need for a new and improved pizza wedge support as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of pizza container support apparatus now present in the prior art, the present invention provides a pizza wedge support wherein the same is positionable upon automotive seats for maintaining a horizontal support surface for pizza containers. As such, the general purpose of the present invention, which will be described subsequently in greater detail, is to provide a new and improved pizza wedge support which has all the advantages of the prior art pizza container support structure and none of the disadvantages.

To attain this, the present invention provides a wedge member arranged to provide a horizontal surface when disposed upon an inclined upper surface of an automotive seat. The wedge member is arranged to define an acute included angle from ten to thirty degrees. The organization, in an optional embodiment, includes a strap for receiving an automotive seat belt, as well as an aligned series of cylindrical cup recesses for receiving cup members.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pizza wedge support which has all the advantages of the prior art pizza container support structures and none of the disadvantages.

It is another object of the present invention to provide a new and improved pizza wedge support which may be easily and efficiently manufactured and marketed.

It is a further object of the present invention to provide a new and improved pizza wedge support which is of a durable and reliable construction.

An even further object of the present invention is to provide a new and improved pizza wedge support which is susceptible of a low cost of manufacture with regard to both materials and labor, and which accordingly is then susceptible of low prices of sale to the consuming public, thereby making such pizza wedge supports economically available to the buying public.

Still yet another object of the present invention is to provide a new and improved pizza wedge support which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the instant invention mounted upon an associated automotive seat.

FIG. 4 is an orthographic plan view of the instant invention in an opened configuration illustrating various details thereof.

FIG. 5 is an isometric illustration of the invention in a partially folded configuration.

FIG. 6 is an isometric illustration of a modification of the instant invention.

DESCRIPTION OF THE PREFERRED EMBODIMENT

Figure 1:
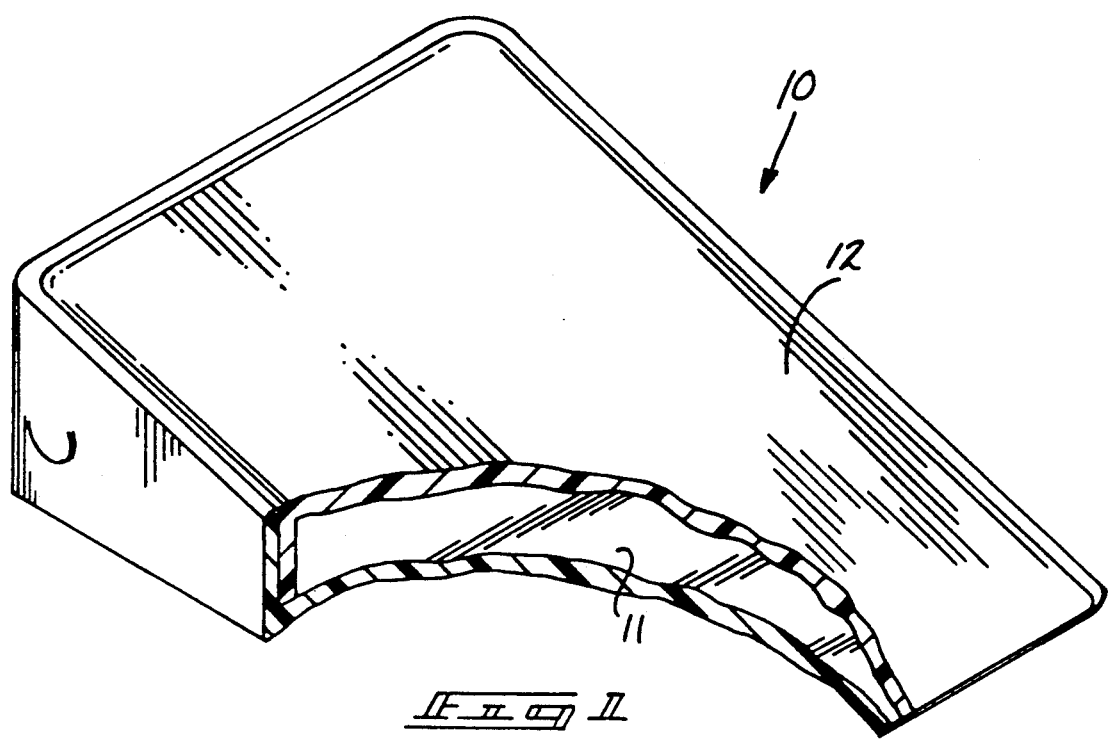
FIG. 1 is an isometric illustration of the instant invention.
Figure 2:
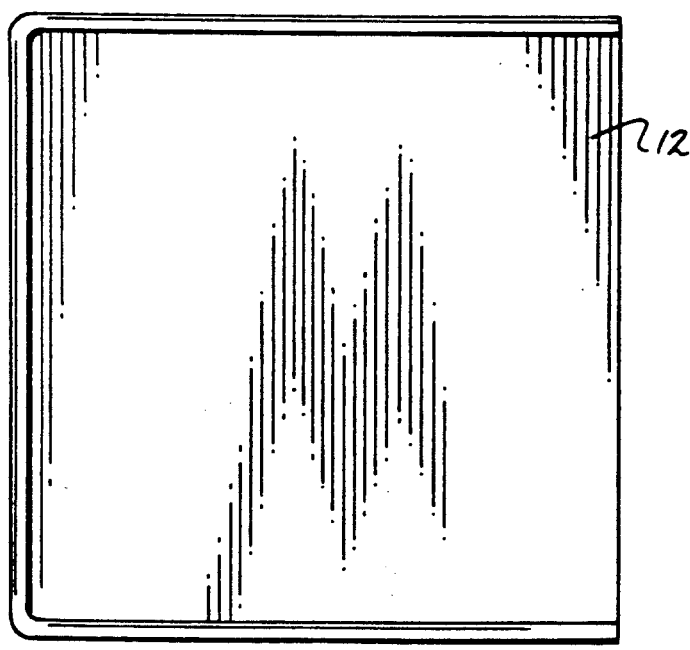
FIG. 2 is an orthographic top view of the instant invention.

With reference now to the drawings, and in particular to FIGS. 1 to 6 thereof, a new and improved pizza wedge support embodying the principles and concepts of the present invention and generally designated by the reference numerals 10 and 10a will be described.

More specifically, the pizza wedge support 10 of the instant invention essentially comprises a housing defined by a floor plate 11 mounted to a roof plate 12 along a first connecting line, with the forward plate 11 including a right and left respective floor flap 14 and 15, and a forward floor flap 16. The right floor flap 14 is mounted by a second connecting line 17 coextensively to a right side of the floor plate 11, with the left floor flap 15 utilizing a third connecting line 18 coextensively mounting the left floor flap coextensively to the left side edge of the floor plate 11, with a fourth connecting line 19 coextensively mounting the forward floor flap 16 coextensively to a forward edge of the floor plate 11.

The roof plate 12 includes a respective right and left roof flap 20 and 21 mounted by a respective fifth and sixth connecting line 23 and 24 coextensively to right and left edges of the roof plate 12. A rear roof flap 22 is mounted by a seventh connecting line 25 coextensively to a rear edge of the roof plate 12. A respective right and left rear flap 26 and 27 are mounted along respective eighth and ninth connecting lines 28 and 29 to opposed side edges of the rear roof flap 22. A right and left respective locking cap 31 and 32 directed to the respective right and left rear flap 26 and 27 are receivable through the right and left locking tab openings 32 and 33 positioned through the right and left roof flaps 20 and 21, as illustrated in FIG. 4 for example.

A modified pizza wedge support structure 10a is set forth in FIG. 6, wherein a unitary rear wall 34 is formed of a "U" shaped configuration, including triangular shaped sides defined by a respective right and left side wall 20a and 20b mounting the floor plate 11 and roof plate 12 therebetween, with the floor and roof plates 11 and 12 defining an acute included angle 41 defining an angle between 10 and 30 degrees that is spaced at an opposed end from the rear wall 34. The organization 10a includes a seat belt flap 37 fixedly and orthogonally mounted to an upper edge of the right side wall 28, with a slot 38 directed adjacent an upper terminal end of the flap 37 to receive an automotive seat belt 43 therethrough. An elastomeric band 35 is positioned for mounting in surrounding relationship about the floor and roof plates to secure a single plurality of container boxes 36 therewithin containing pizza food components to maintain the components in a horizontal orientation, as illustrated in FIG. 3, with either the floor or roof plate positioned in a horizontal orientation relative to a top surface of the associated automotive seat 40. The modified organization 10a further includes a plurality of aligned cylindrical cup recesses 39 positioned in a parallel relationship relative to the rear wall 34 to receive drinking cup members "C" therewithin, as illustrated.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pizza wedge support in combination with an automotive seat, wherein the automotive seat includes a seat member formed with a vertical support and a horizontal support, wherein horizontal support includes a convex top surface, and the automotive seat including an automotive seat belt, and the wedge support comprising a floor plate mounted to a hinge plate along a first connecting line, and the floor plate and roof plate defining an acute angle therebetween defined between ten and thirty degrees, and a rear roof flap defining a rear wall, with the rear roof flap joined to a right side wall and a left side wall, wherein the right and left side walls define triangular identical configurations coextensive and parallel relative to one another, wherein the roof plate defines a horizontal surface when the floor plate is mounted upon the convex top surface of the automotive seat, and wherein the rear wall, the right side wall, and left side wall define a unitary "U" shaped wall member, and wherein the right side wall includes a seat belt flap integrally and orthogonally mounted to a top edge of the right side wall adjacent the roof plate, with the seat belt flap including a slot directed through the seat belt flap adjacent a free terminal end of the seat belt flap spaced from the right side wall, with the seat belt flap receiving the automotive seat belt therethrough, and including an elastomeric band in surrounding relationship relative to the floor plate, roof plate, right side wall, and left side wall to receive at least one container between the roof plate and the elastomeric band, and including an aligned series of cylindrical cup recesses directed through the roof plate, with the recesses arranged parallel relative to and adjacent the rear wall to receive a cup member within each of the recesses for support and transport.

* * * * *